US009715404B2

(12) United States Patent
Woo

(10) Patent No.: US 9,715,404 B2
(45) Date of Patent: Jul. 25, 2017

(54) METHOD AND APPARATUS FOR EXECUTING APPLICATION PROGRAM IN ELECTRONIC DEVICE

(71) Applicant: Samsung Electronics Co., Ltd., Suwon-si, Gyeonggi-do (KR)

(72) Inventor: Seung-Soo Woo, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 14/152,314

(22) Filed: Jan. 10, 2014

(65) Prior Publication Data

US 2014/0201745 A1 Jul. 17, 2014

(30) Foreign Application Priority Data

Jan. 16, 2013 (KR) ........................ 10-2013-0005088

(51) Int. Cl.
*G06F 9/445* (2006.01)
*G06F 9/46* (2006.01)
*G06F 9/44* (2006.01)

(52) U.S. Cl.
CPC .............. *G06F 9/46* (2013.01); *G06F 9/4443* (2013.01); *G06F 9/445* (2013.01)

(58) Field of Classification Search
None
See application file for complete search history.

(56) References Cited

U.S. PATENT DOCUMENTS

| 6,353,928 | B1 * | 3/2002 | Altberg et al. ................ 717/175 |
| 6,363,402 | B1 * | 3/2002 | Matsuura .................. G06F 8/61 |
| 6,505,228 | B1 * | 1/2003 | Schoening et al. ........... 718/106 |
| 7,308,684 | B2 * | 12/2007 | Chan ............................. 717/159 |
| 7,665,065 | B2 * | 2/2010 | Ushiku .................. G06F 9/445 |
| | | | 717/120 |
| 7,971,186 | B1 * | 6/2011 | Peyton .......................... 717/115 |
| 8,150,952 | B2 * | 4/2012 | Masuda .................. G06F 9/542 |
| | | | 340/540 |
| 8,504,607 | B2 * | 8/2013 | Dewa ............... G11B 20/00086 |
| | | | 709/202 |
| 8,671,386 | B2 * | 3/2014 | Ishii et al. ..................... 717/105 |
| 8,909,027 | B2 * | 12/2014 | Pierre .......................... 386/248 |
| 9,015,681 | B1 * | 4/2015 | Bryan ....................... G06F 8/43 |
| | | | 717/141 |
| 2003/0009507 | A1 * | 1/2003 | Shum .................. G06F 11/3409 |
| | | | 718/104 |
| 2005/0262496 | A1 * | 11/2005 | Seki et al. ..................... 717/170 |
| 2006/0048108 | A1 * | 3/2006 | Ushiku .................. G06F 9/485 |
| | | | 717/136 |

(Continued)

FOREIGN PATENT DOCUMENTS

KR 10-2010-0071794 A 6/2010
WO 2012/128795 A1 9/2012

*Primary Examiner* — Tuan Q. Dam
*Assistant Examiner* — Zheng Wei
(74) *Attorney, Agent, or Firm* — Jefferson IP Law, LLP

(57) ABSTRACT

An apparatus and a method for displaying application program information in an electronic device are provided. The method for displaying the application program information includes executing a first application program, determining at least one application program capable of being executed after the first application program, and displaying, on a display unit, information on the at least one application program.

8 Claims, 17 Drawing Sheets

(56) References Cited

U.S. PATENT DOCUMENTS

| | | | |
|---|---|---|---|
| 2006/0075394 A1* | 4/2006 | Iwamoto | G06F 9/44521 717/162 |
| 2006/0161650 A1* | 7/2006 | Kim | H04M 1/72544 709/224 |
| 2009/0094562 A1* | 4/2009 | Jeong et al. | 715/863 |
| 2009/0172568 A1* | 7/2009 | Arthursson et al. | 715/762 |
| 2009/0193410 A1* | 7/2009 | Arthursson | G06F 9/45504 717/173 |
| 2009/0293041 A1* | 11/2009 | Wollnik et al. | 717/110 |
| 2009/0313621 A1* | 12/2009 | Dewa | G11B 20/00086 718/1 |
| 2010/0079392 A1* | 4/2010 | Chiang et al. | 345/173 |
| 2010/0159896 A1* | 6/2010 | Shin et al. | 455/414.1 |
| 2010/0287552 A1* | 11/2010 | Kim | G06F 9/445 718/100 |
| 2011/0028138 A1 | 2/2011 | Davies-Moore et al. | |
| 2011/0265040 A1* | 10/2011 | Shin | G06F 3/0485 715/830 |
| 2011/0275391 A1* | 11/2011 | Lee | H04M 1/7253 455/500 |
| 2011/0307884 A1* | 12/2011 | Wabe et al. | 717/178 |
| 2012/0072871 A1* | 3/2012 | Seo | H04N 5/445 715/838 |
| 2012/0235930 A1* | 9/2012 | Lazaridis | G06F 3/017 345/173 |
| 2012/0260268 A1* | 10/2012 | Mirkin | G01C 21/26 719/328 |
| 2013/0173637 A1* | 7/2013 | Kim | G06Q 30/02 707/748 |
| 2013/0239129 A1* | 9/2013 | Kim | G06F 9/54 719/320 |
| 2013/0246728 A1* | 9/2013 | Nishiguchi | G06F 12/145 711/163 |
| 2013/0282786 A1* | 10/2013 | Chen | H04L 67/10 709/201 |
| 2014/0092264 A1* | 4/2014 | Kim | H04N 5/23241 348/207.11 |
| 2014/0168125 A1* | 6/2014 | Seo | G06K 9/00026 345/173 |

* cited by examiner

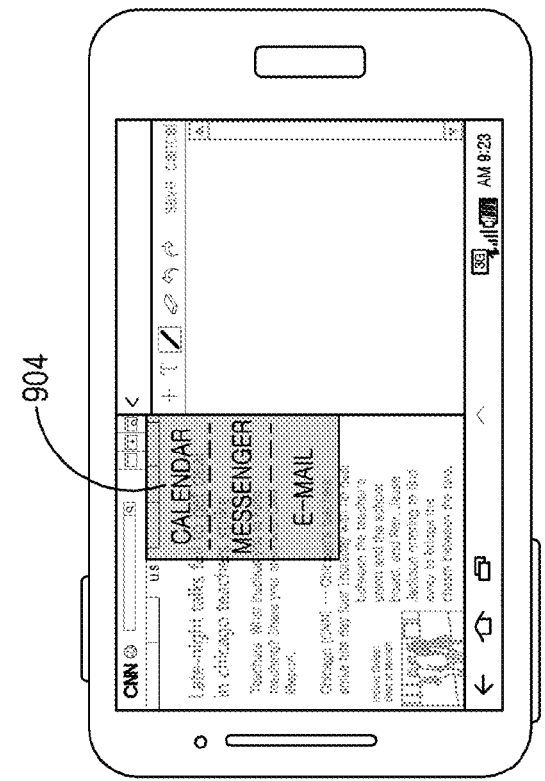
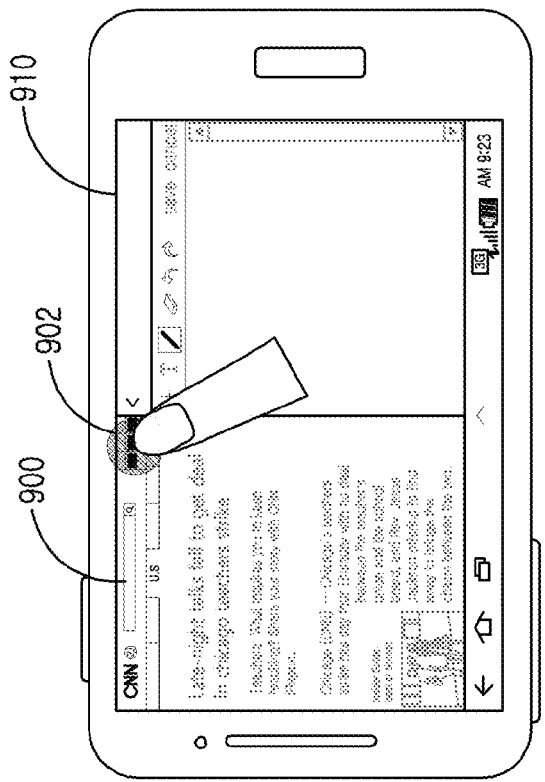
FIG.9B
FIG.9A

METHOD AND APPARATUS FOR EXECUTING APPLICATION PROGRAM IN ELECTRONIC DEVICE

CROSS-REFERENCE TO RELATED APPLICATION

This application claims the benefit under 35 U.S.C. §119 (a) of a Korean patent application filed on Jan. 16, 2013 in the Korean Intellectual Property Office and assigned Serial number 10-2013-0005088, the entire disclosure of which is hereby incorporated by reference.

TECHNICAL FIELD

The present disclosure relates to a method and apparatus for executing an application program in an electronic device.

BACKGROUND

Due to their high portability, portable electronic devices have now become necessities. Moreover, the portable electronic devices have developed into multimedia devices that provide various multimedia services using data communication services in addition to voice call services due to the development in communication technologies.

When various application programs are installed on electronic devices, users of the electronic devices experience inconveniences as they need to directly search for and execute a specific application program that is installed on the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide apparatuses and methods for enabling users to easily execute application programs in consideration of the relation between application programs in electronic devices.

Another aspect of the present disclosure is to provide an apparatus and method for displaying information on at least one second application program that may be executed after a first application program in electronic devices.

Another aspect of the present disclosure is to provide an apparatus and method for aligning the display, according to user's preference, at least one second application program associated with a first application program in electronic devices.

Another aspect of the present disclosure is to provide an apparatus and method for displaying information in at least one second application program that may be executed after a first application program is executed in a second electronic device connected through a local area network in an electronic device.

Another aspect of the present disclosure is to provide an apparatus and method for aligning and displaying, according to user's preference, at least one second application program associated with a first application program being executed in a second electronic device connected through a local area network on an electronic device.

Another aspect of the present disclosure is to provide an apparatus and device for displaying information on at least one second application program that may be executed after a first application program by using a variable icon displayed on the home screen on an electronic device.

In accordance with an aspect of the present disclosure, a method of displaying application program information on an electronic device is provided. The method includes executing a first application program; determining at least one application program capable of being executed after the first application program; and displaying, on a display unit, information on the at least one application program.

In accordance with another aspect of the present disclosure, a method of displaying application program information on an electronic device is provided. The method includes receiving application program information from a first electronic device through a local area network, checking a first application program executed in the first electronic device by using the application program information; and displaying, on a display unit, information on a first application program.

In accordance with another aspect of the present disclosure, an electronic device is provided. The electronic device includes a display unit, a memory, and at least one processor, wherein the processor determines at least one application program capable of being executed after a first application program if the first application program is executed, and displays, on the display unit, information on the at least one application program.

In accordance with another aspect of the present disclosure, an electronic device is provided. The electronic device includes a display unit, a communication unit; a memory; and at least one processor, wherein if application program execution information is received from a first electronic device through the communication unit, the processor checks a first application program executed in the first electronic device by using the application program execution information and displays information on the first application program on the display unit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 9A and 9B illustrate screens configuration for displaying an application program list by using multiple screens in an electronic device according to an embodiment of the present disclosure;

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to an apparatus and method for easily executing the application program in consideration of the relation between application programs on the electronic device.

A technology to represent information on executable application programs in consideration of the relation between application programs in an electronic device will be described below.

In the following description, the electronic device may include one or more of a mobile communication terminal, a PDA, a PC, a laptop computer, a smart phone, a net book, a TV, a Mobile Internet Device (MID), an Ultra Mobile PC (UMPC), a tablet PC, a navigation device, a smart TV, and an MP3 player.

Figure 1:
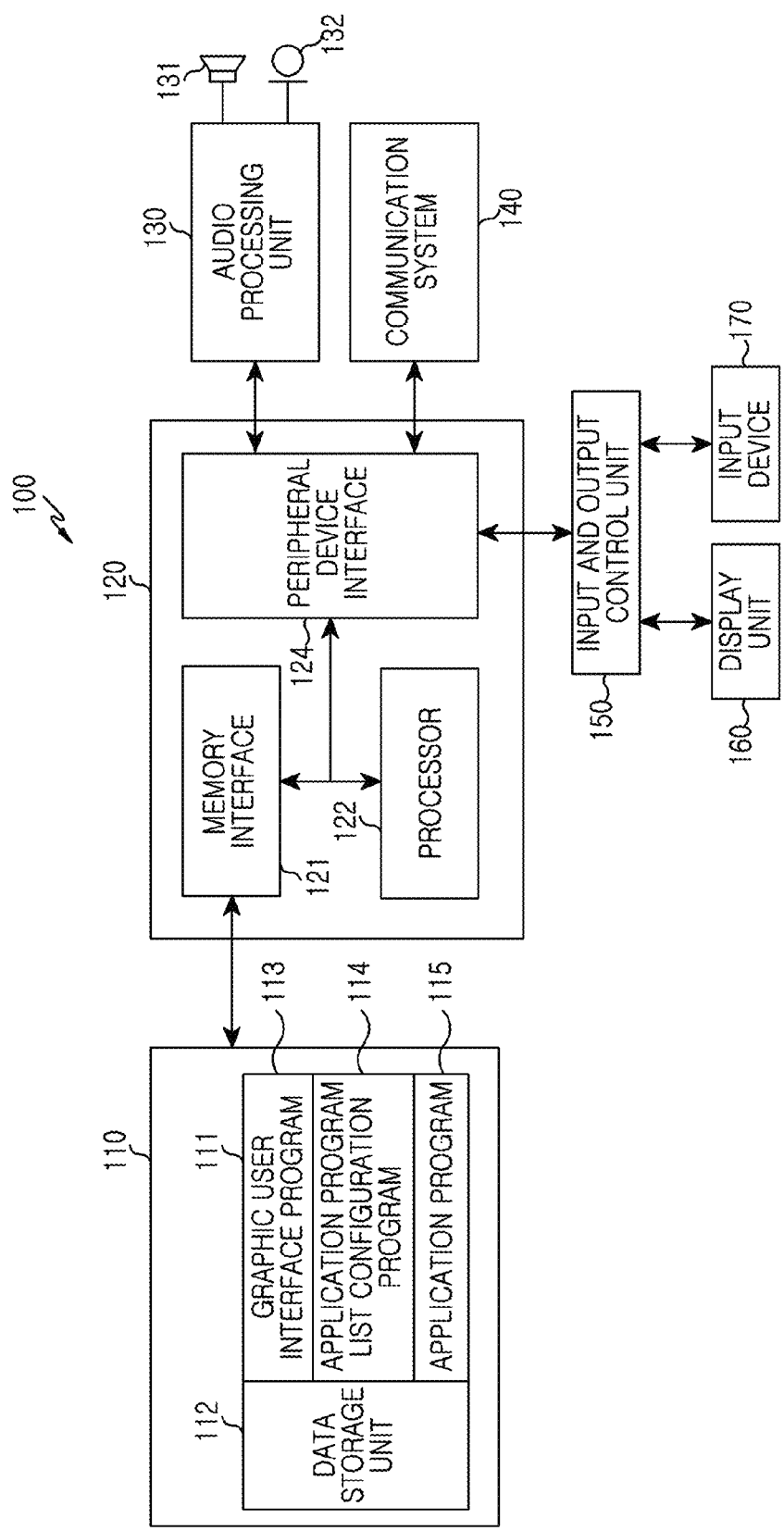
FIG. 1 is a block diagram of an electronic device according to an embodiment of the present disclosure.

FIG. 1 is a block diagram of an electronic device according to an embodiment of the present disclosure.

Referring to FIG. 1, an electronic device 100 includes a memory 110, a processor unit 120, an audio processing unit 130, an input and output control unit 150, a display unit 160, and an input device 170. Here, the memory 110 may be in plural.

The memory 110 includes a program storage unit 111 storing programs for controlling the operation of the electronic device 100, and a data storage unit 112 storing data generated during the execution of a program.

The data storage unit 112 stores an application program list associated with each application program. For example, the data storage unit 112 may store a preset application program list table that includes an application program list associated with each application program, as in Table 1 below.

TABLE 1

| Application program | List of application programs | | | |
|---|---|---|---|---|
| | Single device | | Multi device | |
| | Single screen | Multi screen | Portable device | Fixed device |
| Telephone | address book, memo, messenger, calendar, email, browser, map, calculator | address book, memo, messenger, calendar, email, browser, map, calculator | address book, memo, messenger, calendar, email, browser, map, calculator | address book, memo, messenger, calendar, email, browser, map, calculator |
| Address | telephone, | telephone, | telephone, | telephone, |

TABLE 1-continued

List of application programs

| Application program | Single device | | Multi device | |
| --- | --- | --- | --- | --- |
| | Single screen | Multi screen | Portable device | Fixed device |
| book | messenger, email, memo | messenger, email, memo | messenger, email, memo | messenger, email, memo |
| Calendar | telephone, messenger, email | telephone, messenger, email | telephone, messenger, email | telephone, messenger, email |
| Camera | browser, photograph book | browser, photograph book | browser, photograph book | browser, photograph book |
| Photograph book | telephone, messenger, email, photograph edit, social network, calendar | telephone, messenger, email, photograph edit, social network, calendar | telephone, messenger, email, photograph edit, social network, calendar | telephone, messenger, email, photograph edit, social network, calendar |
| TV | telephone, messenger, email | telephone, messenger, email | telephone, messenger, email | telephone, messenger, email |
| Music | messenger, email, browser | messenger, email, browser | messenger, email, browser | messenger, email, browser |
| Browser | memo | memo | memo | memo |
| Memo | browser, photograph book, calendar, messenger, email | browser, photograph book, calendar, messenger, email | browser, photograph book, calendar, messenger, email | browser, photograph book, calendar, messenger, email |
| Game | Browser, messenger | Browser, messenger | Browser, messenger | Browser, messenger |

As another example, the data storage unit 112 may also store an application program list associated with each application program that is created by an application program configuration program 114. Here, the application program list includes information on at least one application program that may be executed after an application program being executed by a processor 122.

The program storage unit 111 includes a Graphic User Interface (GUI) program 113, the application program list configuration program 114, and at least one application program 115. Here, programs included in the program storage unit 111 is a set of instructions and may be represented by an instruction set.

Figure 17:
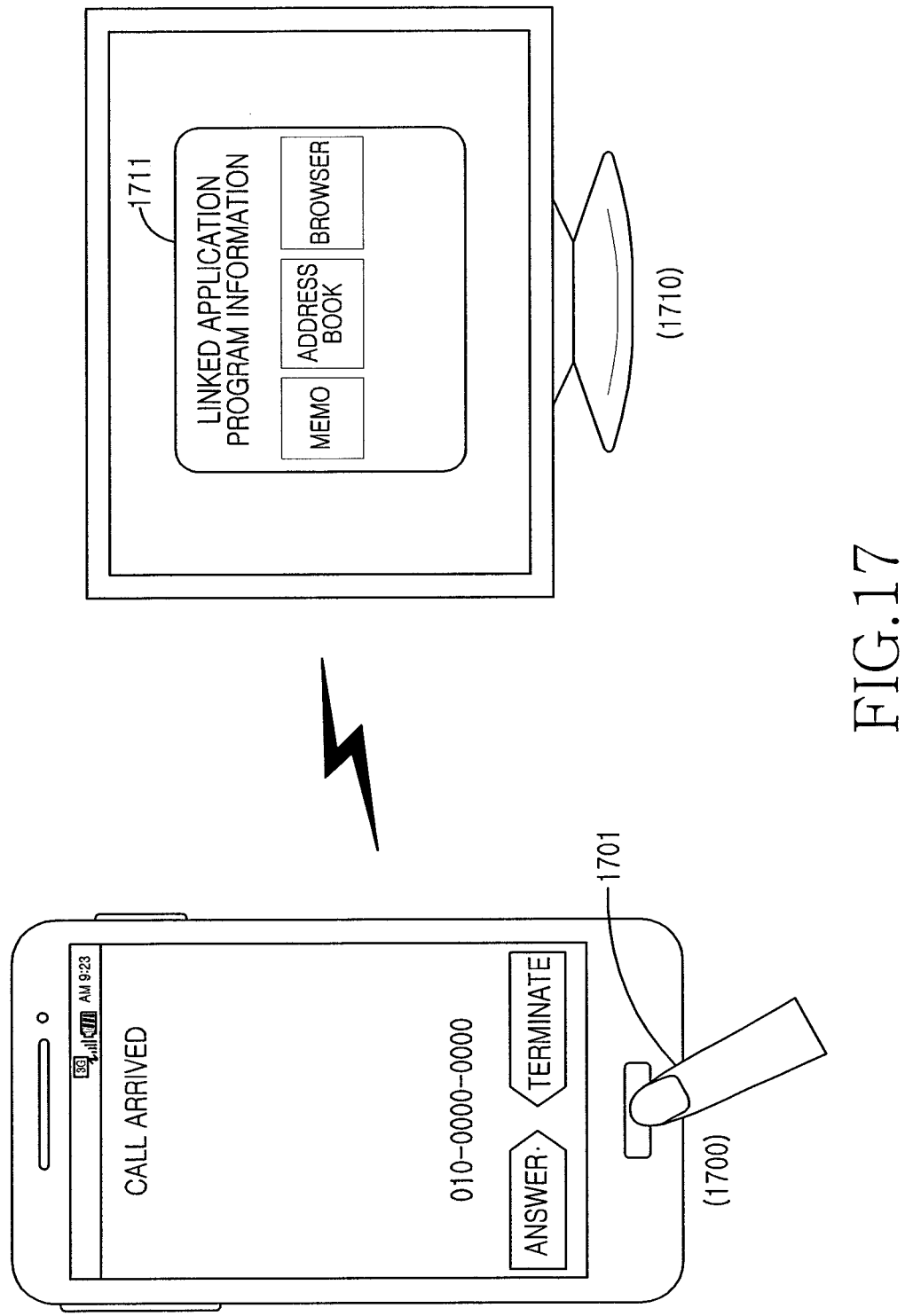
FIG. 17 illustrates a screen configuration for displaying an application program list in an electronic device according to an embodiment of the present disclosure.

The GUI program 113 includes at least one software component for providing, to the display unit 160, a user interface by using graphics. For example, the GUI program 113 includes an instruction to display, on the display unit 160, information on an application program executed by the processor 122. If an event to display an application program list occurs, the GUI program 113 may control an application program list associated with an application program being executed by the processor 122 among the application program list stored in the data storage unit 112 so that the application program list associated with the application program being executed is displayed on the display unit 160 as shown in FIGS. 7A to 9B. As another example, the GUI program 113 may also control an application program list associated with an application program being executed by an opposite electronic device connected through a local area network among the application program list stored in the data storage unit 112 so that the application program list associated with the application program being executed is displayed on the display unit 160 as shown in FIG. 17.

The application program list configuration program 114 includes at least one software component for creating an application program list for each application program. For example, the application program list configuration program 114 may create an application program list for each application program according to input information provided through the input device 170. In particular, if an event to input an application program list occurs, the application program list configuration program 114 controls an application program list input window through the GUI program 113 so that the window is displayed on the display unit 160. Then the application program list configuration program 114 may create an application program list for each application program according to application program information provided through the application program list input window.

As another example, the application program list configuration program 114 may also create an application program list for each application program based on application program execution information by the processor 122. In particular, the application program list configuration program 114 may also create an application program list that may be executed after a first application program, based on the type, and execution time point, and execution time period of a second application program to be executed during or after the execution of the first application program by the processor 122. Furthermore, the application program list configuration program 114 may also update an application program list table like Table 1 based on application program execution information by the processor 122. In this case, at least some of application programs included in an application program list for specific application programs included in the application program list table may be fixed to a corresponding application program list. Here, the second application program may include at least one application program excluding the first application program among application programs 115 that are installed on the electronic device 100. Also, the execution time period of an application program may include a time period from when the application program is executed to when the application program is terminated.

As another example, the application program list configuration program 114 may also create an application program list for each application program based on information on an application program executed by the processor from when receiving application program execution information from an opposite electronic device connected through a local area network. In particular, the application program list configuration program 114 may also create an application program list for application programs being executed in an opposite device, based on the type, and execution time point, and execution time period of an application program executed by the processor 122 from when receiving application program execution information from the opposite electronic device connected through a local area network.

As another example, the application program list configuration program 114 may also update application program list information provided from an opposite electronic device connected through a local area network. In particular, the application program list configuration program 114 may also update an application program list to include only information on application programs that may be executed on the electronic device 100 among application programs included in an application program list provided from an opposite electronic device connected through a local area network.

The application program 115 includes a software component for at least one application program that is installed on the electronic device 100.

The processor unit 120 includes a memory interface 121, at least one processor 122, and a peripheral device interface 123. Here, the memory interface 121, the at least one processor 122, and the peripheral interface 123 that are included in the processor unit 120 may be integrated in at least one integrated circuit or may be implemented in separate components.

The memory interface 121 controls an access of a component, such as the processor 122 or the peripheral device interface 124 to the memory 110.

The peripheral device interface 124 controls the connection of an input and output peripheral device to the processor 122 and the memory interface 121.

The processor 122 controls the electronic device 100 so that the electronic device 100 provides various multimedia services by using at least one software program. In this case, the processor 122 executes at least one program stored in the memory 110 and provides a service corresponding to that program. For example, the processor 122 may execute the application program list configuration program 113 stored in the program storage unit 111 and create an application program list for each application program.

The audio processing unit 130 provides an audio interface between a user and the electronic device 100 through a speaker 131 and a microphone 132.

The input and output control unit 150 provides an interface between the peripheral device interface 124 and an input and output device, such as the display unit 160 and the input device 170.

The display unit 160 displays state information on the electronic device 100, letters input by a user, moving pictures and still images. For example, the display unit 160 displays information on application programs executed by the processor 122. In this case, if an event to display an application program list occurs, the display unit 160 may display an application program list associated with an application program being executed by the processor 122 as shown in FIGS. 7 to 9. As another example, the display unit 160 may also display an application program list associated with an application program being executed by an opposite electronic device connected through a local area network among application programs stored in the data storage unit 112 as shown in FIG. 17.

The input device 170 provides input data generated by user's selection to the processor unit 120 through the input and output control unit 150. In this case, the input device 170 includes a key pad including at least one hardware button and a touch pad sensing touch information.

Furthermore, the electronic device 100 may include a communication system 140 that performs a communication function for voice communication and data communication. For example, the communication system 140 may be divided into a plurality of communication sub modules that support different communication networks. Here, the communication network is not limited thereto but includes a Global System for Mobile communication (GSM) network, an Enhanced Data GSM Environment (EDGE) network, a Code Division Multiple Access (CDMA) network, a W (Wideband)-CDMA network, a Long Term Evolution (LTE) network, an Orthogonal Frequency Division Multiple Access (OFDAM) network, a wireless LAN, a Bluetooth network and Near Field Communication (NFC).

In the above-described embodiment, the processor 122 may execute software components stored in the memory 110 in one module and create an application program list for each application program.

Figure 2:
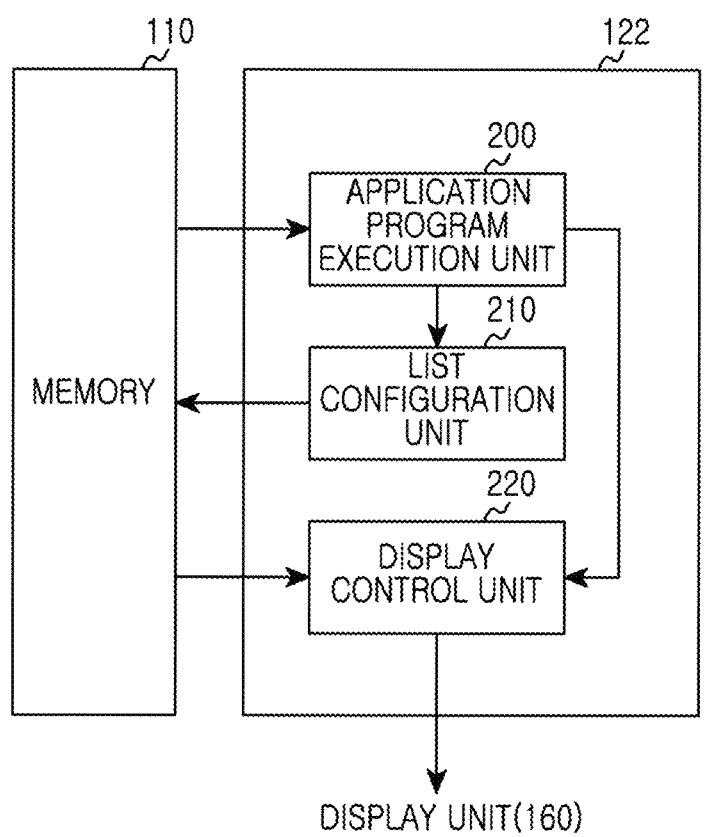
FIG. 2 is a detailed block diagram of a processor according to an embodiment of the present disclosure.

In another embodiment, the processor 122 may be configured to include, as separate modules, a component for creating an application program list for each application as shown in FIG. 2.

FIG. 2 is a detailed block diagram of a processor according to an embodiment of the present disclosure.

Referring to FIG. 2, the processor 122 includes an application program execution unit 200, a list configuration unit 210, and a display control unit 220.

The application program execution unit 200 executes at least one application program 115 stored in the program storage unit 111 and provides a service according to a corresponding application program.

The list configuration unit 210 executes the application program list configuration program 114 stored in the program storage unit 111 and creates an application program list for each application program. For example, the list configuration unit 210 may create an application program list for each application program according to input information provided through the input device 170. In particular, if an event to input an application program list occurs, the list configuration unit 210 may request the display control unit 220 to display an application program list input window on the display unit 160. Then, the list configuration unit 210 may create an application program list for each application program according to application program information input through the application list input window.

As another example, the list configuration unit 210 may also create an application program list for each application program based on application program execution information by the application program execution unit 200. In particular, the list configuration unit 210 may also create an application program list that may be executed after a first application program based on the type, execution time point, and execution time period of a second application program to be executed during or after the execution of the first application program by the application program execution unit 200. Furthermore, the list configuration unit 210 may also update an application program list table like Table 1 stored in the data storage unit 112 based on application program execution information by the application program execution unit 200. In this case, at least some of application programs included in an application program list for specific application programs included in the application program list table may be fixed to a corresponding application program list. Here, the second application program may include at least one application program excluding the first application program among application programs 115 that are installed on the electronic device 100.

As another example, the list configuration unit 210 may also create an application program list for each application program based on information on an application program executed by the application program execution unit 200 from when receiving application program execution information from an opposite electronic device connected through a local area network. In particular, the list configuration unit 210 may also create an application program list for application programs being executed in an opposite device, based on the type, and execution time point, and execution time period of an application program executed by the application program execution unit 200 from when receiving application program execution information from the opposite electronic device connected through a local area network.

As another example, the list configuration unit 210 may also update application program list information provided from an opposite electronic device connected through a local area network. In particular, the list configuration unit 210 may also update an application program list to include only information on application programs that may be executed on the electronic device 100 among application programs included in an application program list provided from an opposite electronic device connected through a local area network.

The display control unit 220 enables the GUI program 113 stored in the program storage unit 111 in the memory 110 to be executed and a user interface to be displayed on the display unit 160 by using graphics. For example, the display control unit 220 enables information on application programs to be executed by the application program execution unit 200. In this case, if an event to display an application program list occurs, the display control unit 220 may enable an application program list associated with an application program being executed by the application program execution unit 200 to be displayed on the display unit 160 as shown in FIGS. 7 to 9. As another example, the display control unit 220 may also enable an application program list associated with an application program being executed by an opposite electronic device connected through a local area network among application programs stored in the data storage unit 112 to be displayed on the display unit 160 as shown in FIG. 17.

Figure 3:
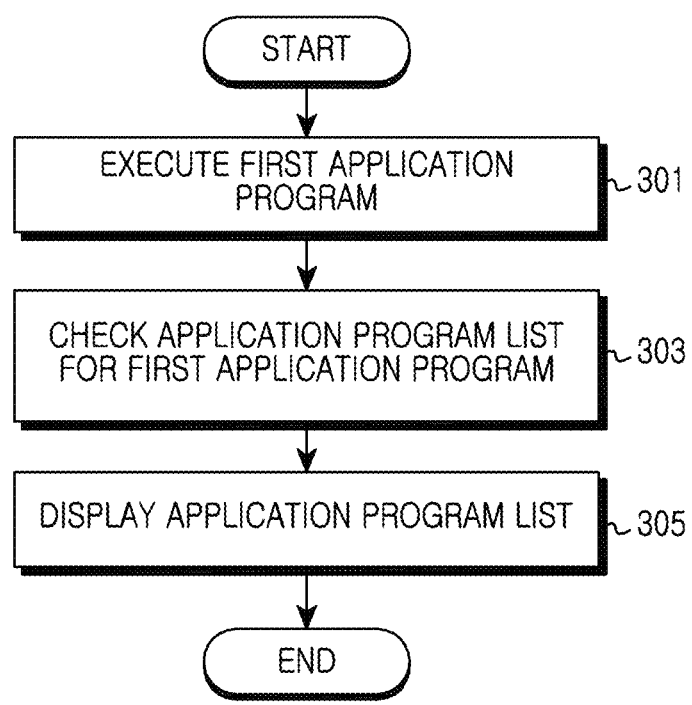
FIG. 3 is a flowchart of a procedure for displaying an application program list in an electronic device according to an embodiment of the present disclosure.

FIG. 3 is a flowchart of a procedure for displaying an application program list in an electronic device according to an embodiment of the present disclosure.

Referring to FIG. 3, the electronic device executes a first application program in operation 301. For example, the electronic device may execute the first application program if a touch on a first application program icon through the input device 170 is sensed. As another example, the electronic device may execute the first application program if a first application program execution signal, such as an incoming-call signal is sensed.

If the first application program is executed, the electronic device checks an application program list for the first application program in operation 303. For example, if an event to display an application program list, the electronic device may check an application program list for the first application program among application program lists stored in the data storage unit 112. As another example, the electronic device may also compare the weight of each application program relative to the first application program and create an application program list for the first application program. Here, the application program list includes information on at least one application program that may be executed after an application program being executed in an electronic device. The weight of each application program may be set based on the type, execution time point and execution time period of an application program to be executed during or after the execution of the first application program.

Figure 7A:
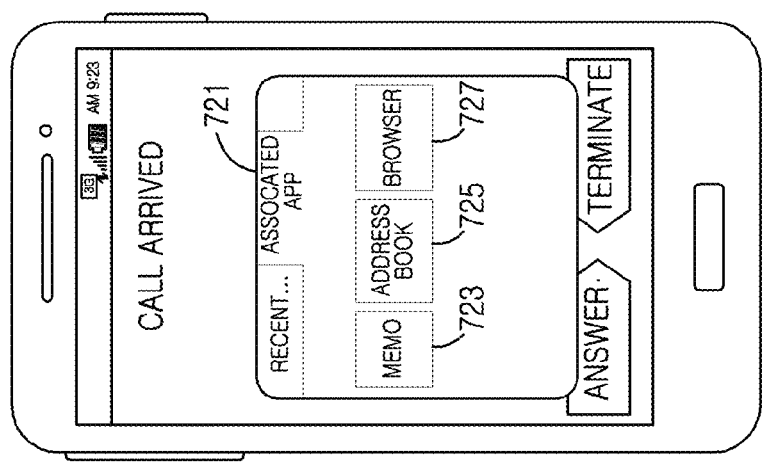
FIGS. 7A, 7B, and 7C illustrate screens configuration for displaying an application program list by using a pop-up window in an electronic device according to an embodiment of the present disclosure.
Figure 7B:
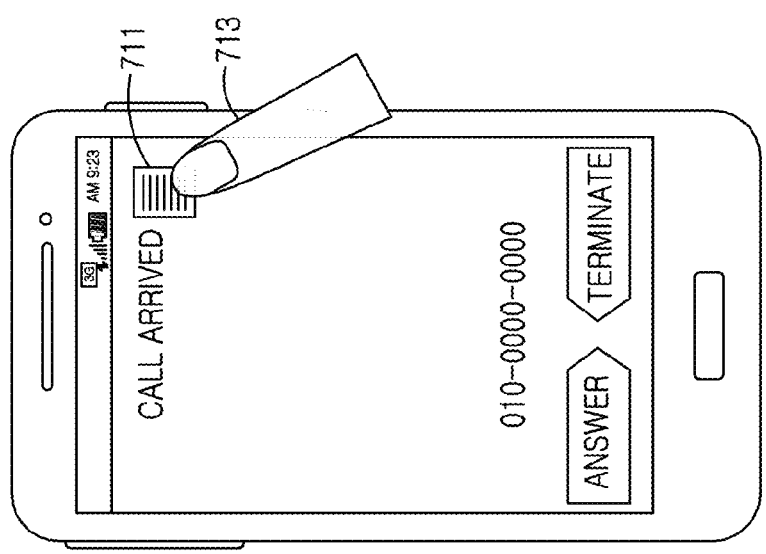
Figure 7C:
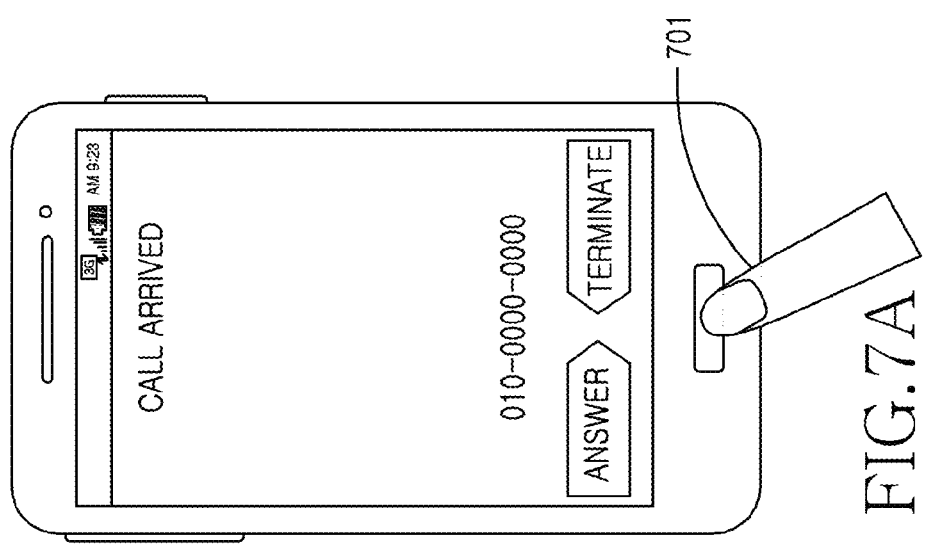
Figure 8A:
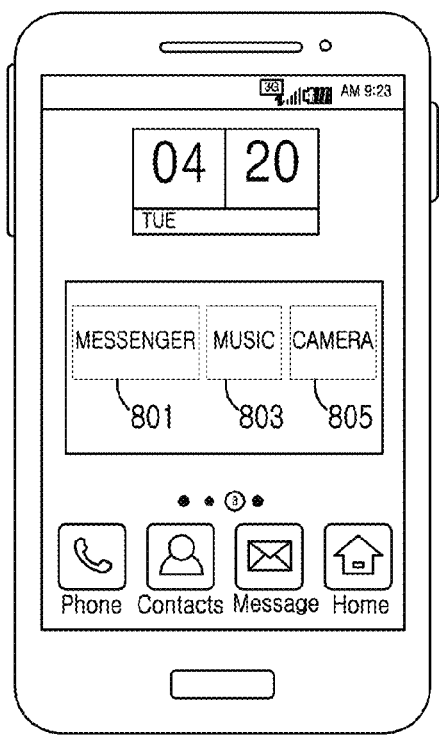
FIGS. 8A, 8B, 8C, and 8D illustrate screens configuration for displaying an application program list by using a variable icon in an electronic device according to an embodiment of the present disclosure.
Figure 8B:
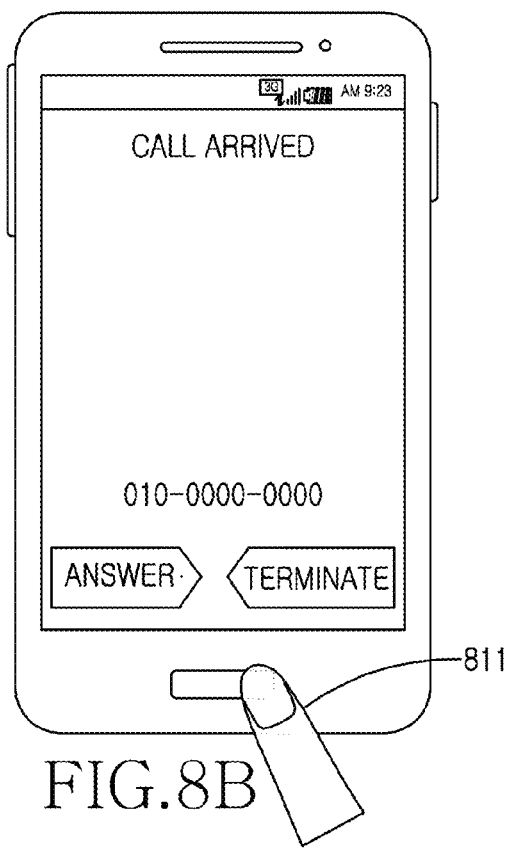
Figure 8C:
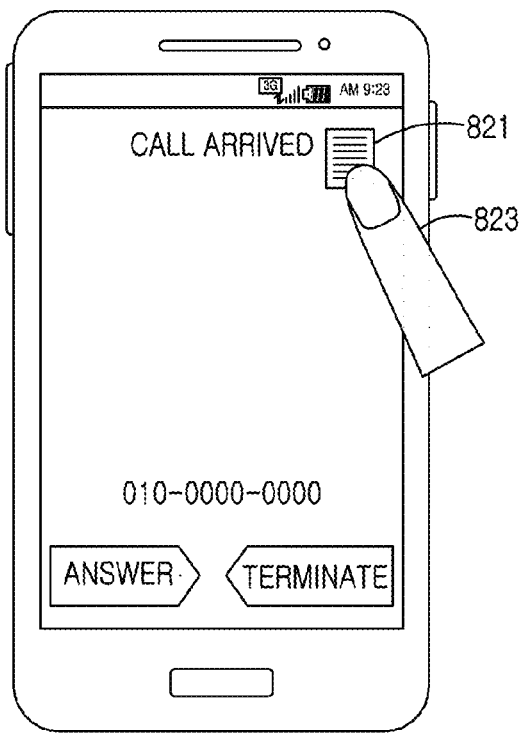
Figure 8D:
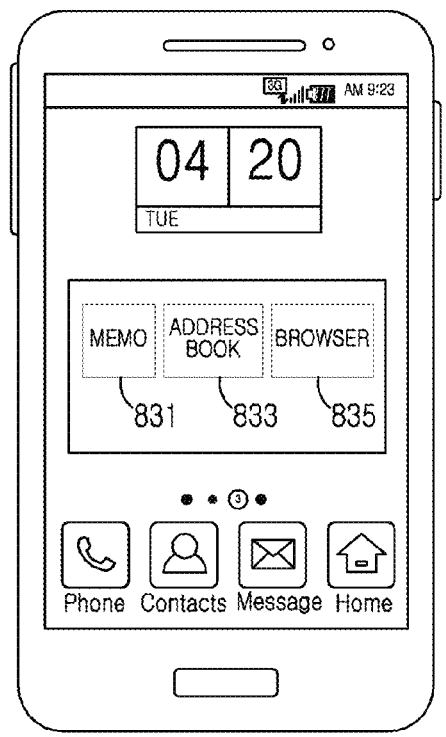

Then, the electronic device displays, on the display unit 160, the application program list for the first application program in operation 305. For example, the electronic device may display a pop-up window 721 including the application program list for the first application program as shown in FIG. 7C. As another example, the electronic device may also change variable icons 831, 833 and 835 on the home screen to application programs included in the application program list for the first application program as shown in FIG. 8D. As another example, when using a multiple-screen function, the electronic device may also display a pop-up window 904 including an application program list on a screen on which an event to display an application program list occurs, as shown in FIG. 9B. As another example, when using a multiple-screen function, the electronic device may also display a pop-up window including an application list on a screen different from a screen on which an event to display an application program list occurs.

Figure 4:
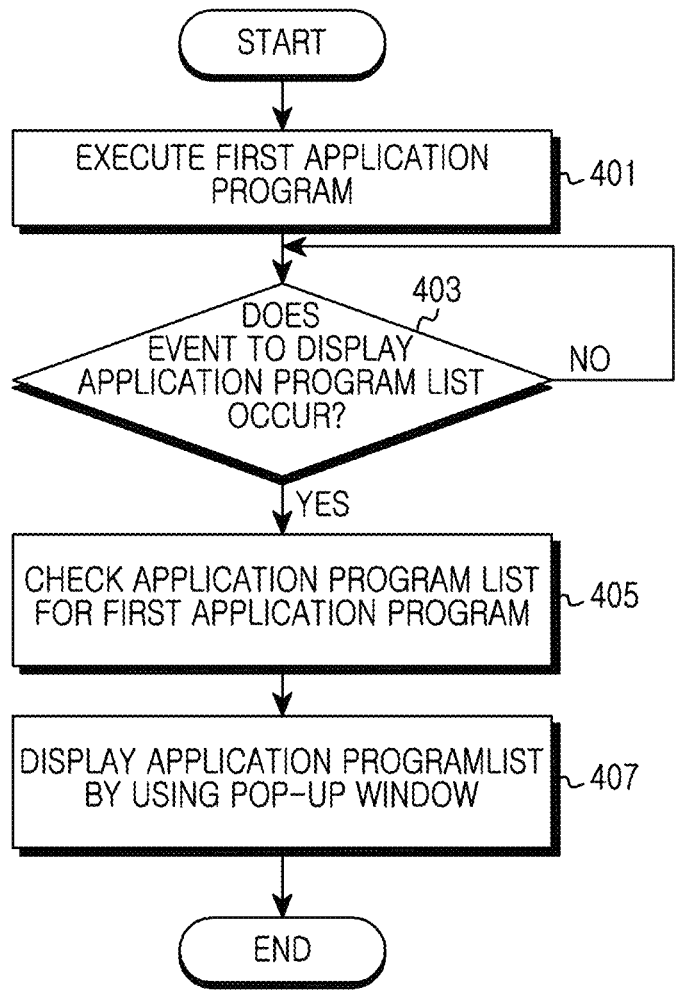
FIG. 4 is a flowchart of a procedure for displaying an application program list by using a pop-up window in an electronic device according to an embodiment of the present disclosure.

FIG. 4 is a flowchart of a procedure for displaying an application program list by using a pop-up window in an electronic device according to an embodiment of the present disclosure.

Referring to FIG. 4, the electronic device executes a first application program in operation 401. For example, the electronic device may execute the first application program when a touch on a first application program icon through the input device 170 is sensed. As another example, if an incoming call is sensed, the electronic device may execute a call application program. In this case, the electronic device displays, on the display unit 160, a call receiving screen as shown in FIGS. 7A and 7B.

If the first application program is executed, the electronic device checks whether an event to display an application program list occurs, in operation 403. For example, the electronic device may check whether an input of a hardware button 701 is maintained over a reference time period on a call-receiving notifying screen as shown in FIG. 7A. Here, the hardware button may include any one of home, volume and power buttons. As another example, the electronic device may also check whether the selection 713 of a list display icon 711 is sensed on the call-receiving notifying screen as shown in FIG. 7B. As another example, when using a multiple-screen function, the electronic device may display a service screen on each screen 900 or 910 as shown in FIG. 9A. In this case, the electronic device may also check whether the selection of a list display icon 902 displayed on any one of multiple screens 900 and 910 is sensed.

If the event to display the application program list occurs ('YES'), the electronic device checks the application program list for the first application program in operation 405. For example, the electronic device may check the application program list for the first application program among application programs stored in the data storage unit 112. As another example, the electronic device may also create the weight of each application program relative to the first application program and create the application program list for the first application program. Here, the application program list may include information on at least one application program that may be executed after an application program being executed on the electronic device. Otherwise, if the event to display the application program list doesn't occur ('NO'), in operation 403, the electronic device continues to check whether an event to display an application program list occurs.

After checking the application program list for the first application program, the electronic device displays, on the display unit 160, the application program list for the first application program in the form of a pop-up window in operation 407. For example, the electronic device may display a pop-up window 721 including a memory 723, an address book 725, and a browser 727 that configure a list of application programs for the first application program as shown in FIG. 7C. As another example, when using a multiple-screen function, the electronic device may also display a pop-up window 904 including a calendar, a messenger, and e-mail that configure a list of application programs, on a screen 900 on which the event to display the application program list occurs as shown in FIG. 9B. As another example, when using a multiple-screen function, the electronic device may also display a pop-up window including the application program list on a screen 910 different from a screen 900 on which the event to display the application program list occurs.

Figure 5:
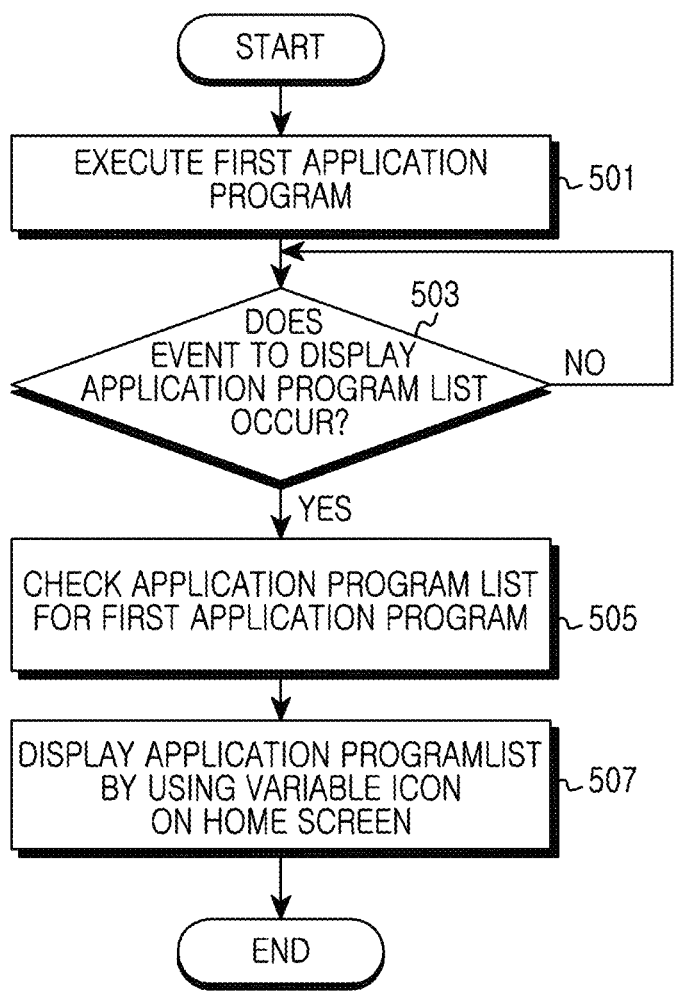
FIG. 5 is a flowchart of a procedure for displaying an application program list by using a variable icon in an electronic device according to an embodiment of the present disclosure.

FIG. 5 is a flowchart of a procedure for displaying an application program list by using a variable icon in an electronic device according to an embodiment of the present disclosure.

Referring to FIG. 5, the electronic device executes a first application program in operation 501. For example, the electronic device may execute the first application program if a touch on an icon for the first application program is sensed through the input device 170. As another example, if an incoming-call is sensed, the electronic device may execute a call application program. In this case, the electronic device may display on the display unit 160 a call-receiving screen as shown in FIGS. 8B and 8C.

If the first application program is executed, the electronic device checks whether an event to display an application program list occurs in operation 503. For example, the electronic device may check whether an input 811 of a hardware button 811 is sensed on a call-receiving notifying screen as shown in FIG. 8B. Here, the hardware button may include any one of home, volume and power buttons. As another example, the electronic device may also check whether the selection 823 of a list display icon 821 is sensed on a call-receiving notifying screen as shown in FIG. 8C.

If the event to display the application program list occurs ('YES'), in operation 503, the electronic device checks an application program list for the first application program in operation 505. For example, the electronic device may check the application program list for the first application program among application program lists stored in the data storage unit 112. As another example, the electronic device may also compare the weight of each application program relative to the first application program and create the application program list for the first application program. Here, the application program list may include information on at least one application program that may be executed after an application being executed on the electronic device. Otherwise, if the event to display the application program list doesn't occur ('NO'), in operation 503, the electronic device continues to check whether an event to display an application program list occurs.

After checking the application program list for the first application program, the electronic device displays the application program list for the first application program on the display unit 160 by using variable icons on the home screen in operation 507. For example, when the variable icons are installed on the home screen, the electronic device may set the variable icons 801, 803, and 805 to be a messenger 801, music 803, and a camera 805 that are basic items, as shown in FIG. 8A. If the event to display the application program list occurs, the electronic device may change and display the variable icons 801, 803, and 805 on the home screen as shown in FIG. 8A, to memo 831, an address book 833, and a browser 805 as shown in FIG. 8D according to the application program list for the first application program.

As described above, if the event to display the application program list occurs, the electronic device may switch from a service screen for a first application to the home screen and display the variable icons 831, 833, and 835 that have been changed according to the application program list for the first application program. In this case, the electronic device may control the first application program so that the first application program is terminated or operates in the background.

In the above-described embodiment, the electronic device may create the application program list for each application program based on execution information on an application program. For example, the electronic device may create the application program list as shown in FIG. 6.

Figure 6:
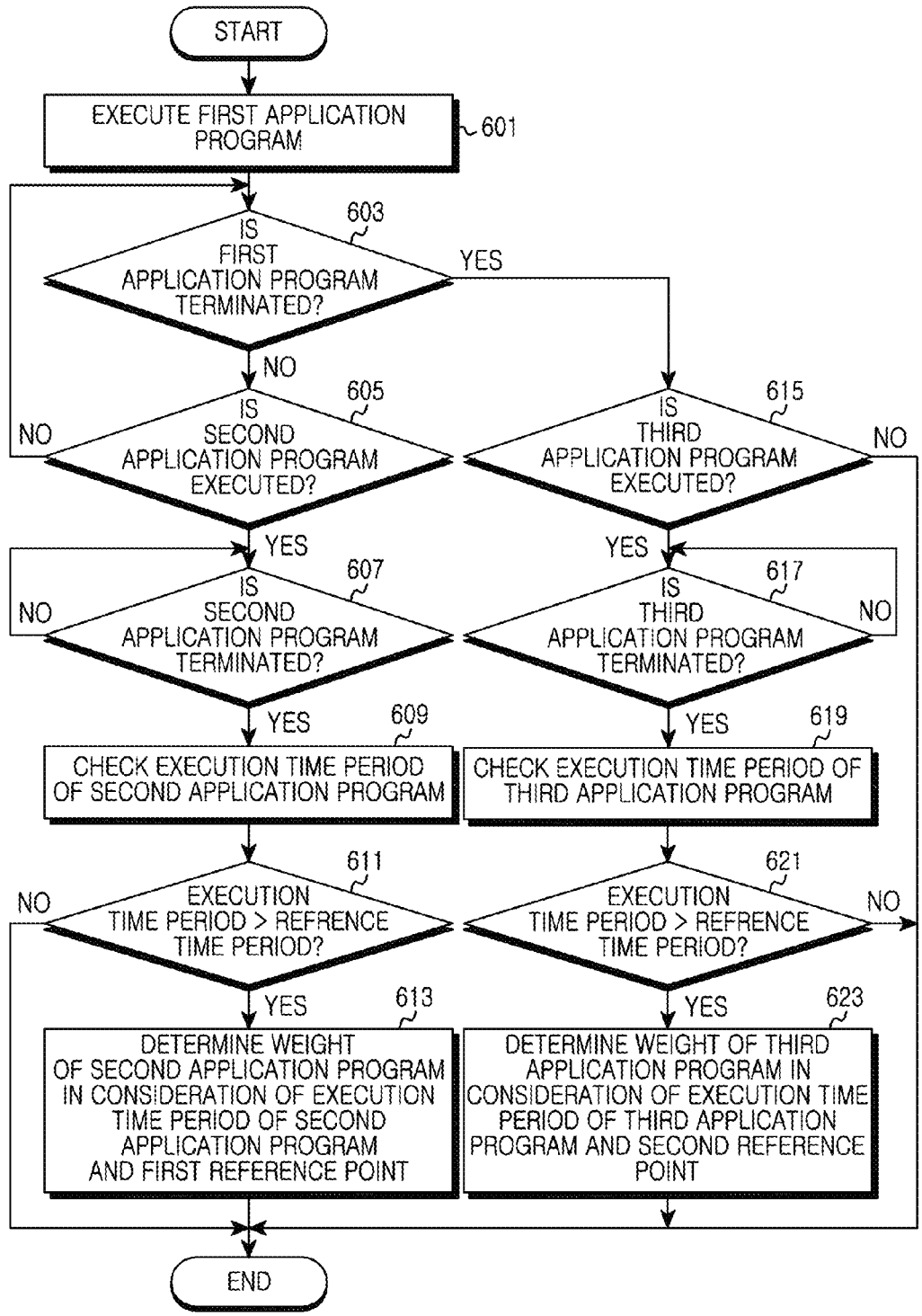
FIG. 6 is a flowchart of a procedure for creating an application program list in an electronic device according to an embodiment of the present disclosure

FIG. 6 is a flowchart of a procedure for creating an application program list in an electronic device according to an embodiment of the present disclosure. In the following description, it is assumed that the electronic device creates the application program list for the first application program.

Referring to FIG. 6, the electronic device executes the first application program in operation 601. For example, the electronic device may execute a first application program if a touch on an icon for the first application program is sensed through the input device 170. As another example, the electronic device may execute the first application program if a first application program execution signal, such as an incoming call signal is sensed.

Then, electronic device checks whether the first application program is terminated, in operation 603.

If the first application is not terminated ('NO'), the electronic device checks whether a second application program is executed, in operation 605. Here, the second application program may include at least one application program excluding the first application program among application programs that are installed on the electronic devices.

If the second application program is not executed, ('NO') in operation 605, the electronic device checks whether the first application program is terminated, in operation 603.

On the other hand, if the second application program is executed, ('YES') in operation 605, the electronic device checks whether the second application program is terminated, in operation 607.

If the second application program is terminated, ('YES') in operation 607, the electronic device checks the execution time period of the second application program in operation 609. Here, the execution time period of the application program may include the time period from when the application program is executed to when the application program is terminated. Otherwise, if the second application program is not terminated, ('NO') in operation 607, the electronic device continues to check if the second application program is not terminated.

Then, the electronic device checks whether the execution time period of the second application program is longer than a reference time period, in operation 611.

If the execution time period of the second application program is shorter than or equal to the reference time period, the electronic device perceives that the second application program is not added to the list of the first application program. Thus, the electronic device may terminate this algorithm.

On the other hand, if the execution time period of the second application program is longer than the reference time period, the electronic device perceives that the second application program may be added to the list of the first application program. Thus, the electronic device determines the weight of the second application program relative to the first application program based on the execution information on the second application program in operation 613. For example, the electronic device may determine the weight of the second application program relative to the first application program by using a first reference point according to the execution time period of the second application program and a weight according to the execution time period of the second application program. Here, the first reference point may represent a weight assigned when the second application program is executed during the execution of the first application program. Also, the weight according to the execution time period of the second application program may be assigned to be smaller than or equal to the first reference point.

On the other hand, if the first application program is terminated ('YES') in operation 603, the electronic device checks whether a third application program is executed in operation 615. In this case, the electronic device may check whether the third application program is executed within the reference time period after the execution of the first application program is terminated. Here, the third application program may include at least one application program excluding the first application program among application programs that are installed on the electronic device.

If the third application program is not executed within the reference time period after the execution of the first application program is terminated, ('NO') in operation 615, the electronic device may terminate this algorithm.

On the other hand, if the third application program is executed within the reference time period after the execution of the first application program is terminated, ('YES') in operation 615, the electronic device checks whether the third application program is terminated in operation 617.

If the third application program is terminated, ('YES') in operation 617, the electronic device checks the execution time period of the third application program in operation 619. Here, the execution time period of the application program may include the time period from when the application program is executed to when the application is terminated. Otherwise, if the third application program is terminated, ('NO') in operation 617, the electronic device continues to check If the third application program is terminated.

Then, the electronic device checks whether the execution time period of the third application program is longer than the reference time period in operation 621.

If the execution time period of the third application program is shorter than or equal to the reference time period, ('NO') in operation 621, the electronic device perceives that the third application program is not added to the list of the first application program. Thus, the electronic device may terminate this algorithm.

On the other hand, if the execution time period of the third application program is longer than the reference time period, ('YES') in operation in 621, the electronic device perceives that the third application program may be added to the list of the first application program. Thus, the electronic device determines the weight of the third application program relative to the first application program based on the execution information on the third application program in operation 623. For example, the electronic device may determine the weight of the third application program relative to the first application program by using a second reference point according to the execution time period of the third application program and a weight according to the execution time period of the third application program. Here, the second reference point is a weight assigned when the third application program is executed after the execution of the first application program, and the second reference point may be assigned to be smaller than the first reference point. Also, the weight according to the execution time period of the third application program may be assigned to be smaller than or equal to the second reference point.

As described above, the electronic device may determine the weight of the second application program relative to the first application program based on the execution information on the second application program executed during the execution of the first application program. In this case, the electronic device may determine the weight of the second application program relative to the first application program based on the execution information on the second application program executed during the execution of the first application program during a preset time section.

If another application program is executed after the execution of the second application program is terminated and before the termination of the first application program, the electronic device may repetitively determine the weight of another application program relative to the first application program based on the execution information on another application program according to operations 609 to 613 of FIG. 6.

Furthermore, if a fourth application program is executed during the execution of the first application program and the second application program, the electronic device determines the weight of the fourth application program relative to the second application program based on the execution information on the fourth application program according to operations 609 to 613 of FIG. 6. For example, the electronic device may determine the weight of the fourth application program relative to the second application program by using the first reference point according to the execution time period of the fourth application program and a weight according to the execution time period of the fourth application program.

On the other hand, the electronic device determines the weight of the fourth application program relative to the first application program based on the execution information on the fourth application program and the execution order of an application program. For example, the electronic device may divide the weight according to the execution information on the fourth application program by the execution order of the fourth application program and determine the weight of the fourth application program relative to the first application program. Here, since the fourth application program is executed during the execution of the first application program and the second application program, the execution order of the fourth execution program may be set to 2.

As described above, the electronic device may determine the weight of the third application program relative to the first application program based on the execution information on the third application program executed within the reference time period after the execution of the first application program. In this case, the electronic device may determine the weight of the third application program relative to the first application program based on the execution information on the third application program executed within the reference time period after the execution of the first application program during a preset time section.

If another application program different from the third application program is executed within the reference time period after the execution of the first application program, the electronic device may repetitively determine the weight of another application program relative to the first application program based on the execution information on another application program according to operations 609 to 613 of FIG. 6.

Furthermore, if a fifth application program is executed during the execution of the third application program, the electronic device determines the weight of the fifth application program relative to the third application program according to operations 609 to 613 of FIG. 6. For example, the electronic device may determine the weight of the fifth application program relative to the third application program by using the first reference point according to the execution time period of the fifth application program and a weight according to the execution time period of the fifth application program. On the other hand, the electronic device may determine the weight of the fifth application program relative to the first application program according to operations 619 to 623 of FIG. 6.

As described above, if the weight of each application program is determined based on the execution information on an application program executed after the first application program, the electronic device may create an application program list for the first application program based on the weight of each application program relative to the first application program. For example, the electronic device may create an application program list for the first application program to include information on at least one application program having a weight larger than a reference value. As another example, the electronic device may also create an application program list for the first application program to include information on a certain number of application programs from an application program having the largest weight.

Furthermore, the electronic device may update an application program list table preset like Table 1 based on the weight of each application program relative to the first application program.

In the above-described embodiment, the electronic device determines the weight of each application program based on the execution information on an application program executed after the execution of the first application program.

When using a multiple-screen function in another embodiment, the electronic device may perceive that application programs executed on a first screen and a second screen according to the multiple-screen function are executed in one electronic device, and may then determine a weight. For example, if the second application program is executed through the second screen while the first application program is executed through the first screen, the electronic device may determine the weight of the second application program relative to the first application program based on the execution information on the second application program according to operations 609 to 613 of FIG. 6.

When using a multiple-screen function in still another embodiment, the electronic device may perceive that application programs executed on a first screen and a second screen according to the multiple-screen function are executed in different electronic devices, and may then determine a weight. For example, if the second application program is executed through the second screen while the first application program is executed through the first screen, the electronic device does not assign the weight of the first application program to the second application program.

Figure 10:
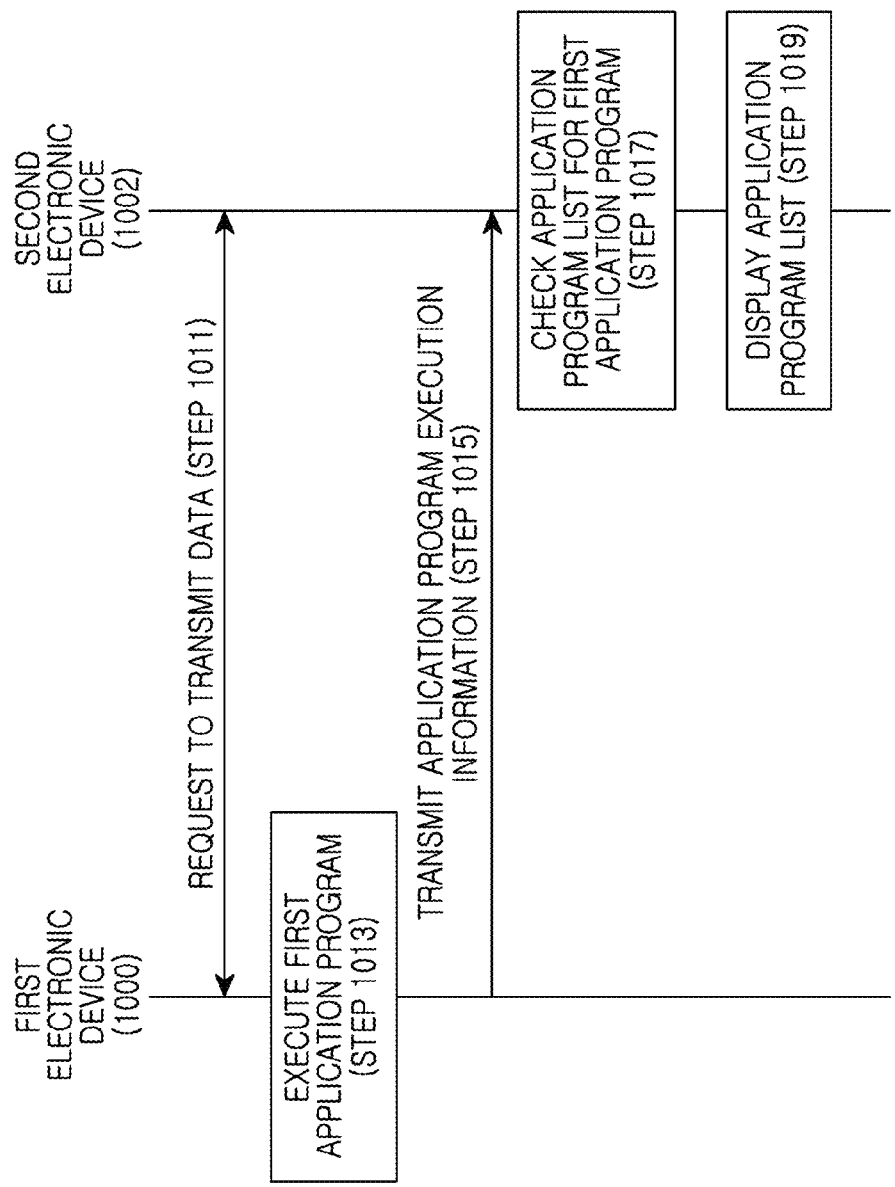
FIG. 10 is a flowchart of a procedure for displaying an application program list by using a local area network according to an embodiment of the present disclosure.

FIG. 10 is a flowchart of a procedure for displaying an application program list by using a local area network according to an embodiment of the present disclosure.

Referring to FIG. 10, a first electronic device 1000 and a second electronic device 1002 establish a communication link through a local area network in operation 1011.

If the first electronic device 1000 executes a first application program in operation 1013, the first electronic device 1000 transmits application program execution information to the second electronic device 1002 through the communication link in operation 1015. For example, referring to FIG. 17, a first electronic device 1700 may execute a call application program according to an incoming call. In this case, the first electronic device 1700 may display a call receiving screen on the display unit 160. If an event to display an application program list occurs in operation 1701, the first electronic device 1700 may transmit execution information on the call application program to a second electronic device 1710 through the communication link. Here, application program execution information includes identification information on the first application program executed in the first electronic device 1000.

A second electronic device 1002 checks the first application being executed in the first electronic device 1000 through application program execution information provided from the first electronic device 1000. Then, the second electronic device 1002 checks an application program list for the first application program among at least one application program that is stored in a data storage unit, in operation 1017.

Then, the second electronic device 1002 displays on a display unit the application program list for the first application program in operation 1019. For example, referring to FIG. 17, the second electronic device 1710 may display a pop-up window 1711 including the application program list for the first application program.

Figure 11:
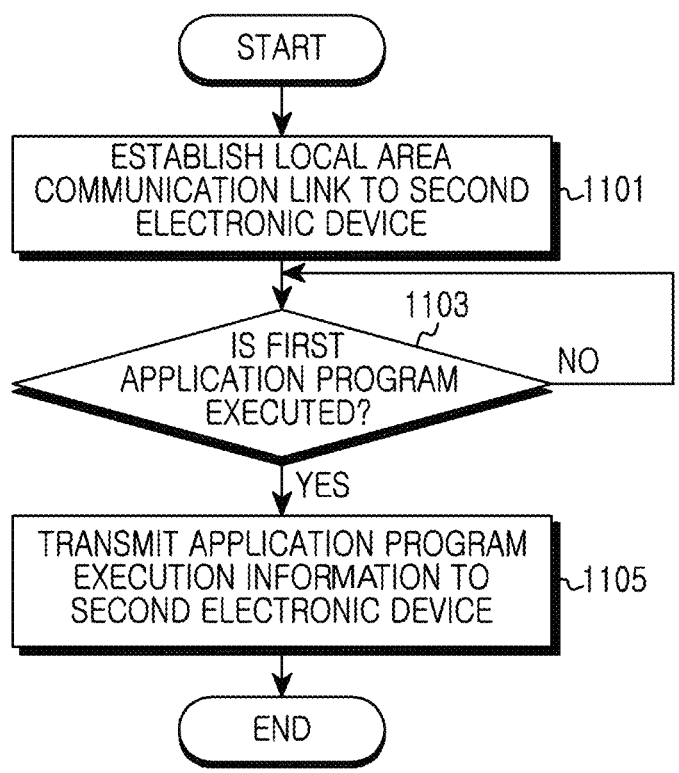
FIG. 11 is a flowchart of a procedure for transmitting application program execution information through a local area network in an electronic device according to an embodiment of the present disclosure.

FIG. 11 is a flowchart of a procedure for transmitting application program execution information through a local area network in an electronic device according to an embodiment of the present disclosure.

Referring to FIG. 11, a first electronic device establishes a communication link to a second electronic device by using a local area network in operation 1101.

If the communication link to the second electronic device is established, the first electronic device checks whether a first application program is executed in operation 1103. For example, the first electronic device may execute the first application program if a touch on an icon for the first application program is sensed through an input device. As another example, the electronic device may execute the first application program if a first application program execution signal, such as an incoming call is sensed.

If the first application program is executed, ('YES') in step 1103, the electronic device transmits application program execution information to the second electronic device through the communication link to the second electronic device in operation 1105. For example, if the incoming call is sensed, the first electronic device 1700 of FIG. 17 may execute a call application program. If an event to display an application program list occurs in operation 1701, the first electronic device 1700 may transmit execution information on the call application program to the second electronic device 1710 through the communication link. Here, the application program execution information includes identification information on the first application program executed in the first electronic device 1700. Otherwise, if the first application program is not executed, ('NO') in step 1103, the first electronic device continues to check whether a first application program is executed.

Figure 12:
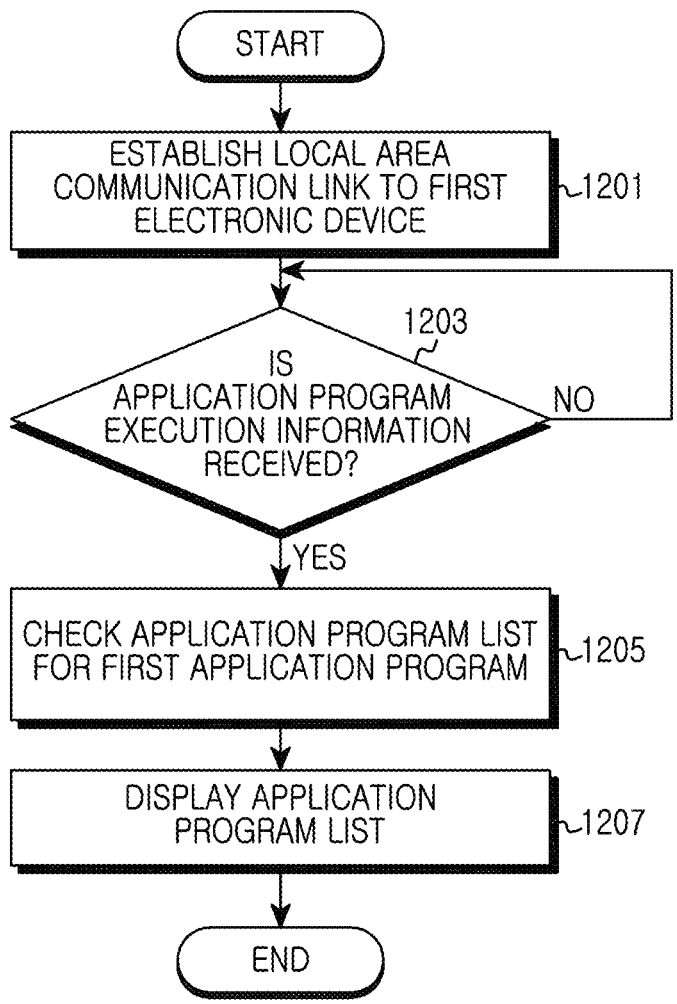
FIG. 12 is a flowchart of a procedure for displaying an application program list for application programs provided through a local area network in an electronic device according to an embodiment of the present disclosure.

FIG. 12 is a flowchart of a procedure for displaying an application program list for application programs provided through a local area network in an electronic device according to an embodiment of the present disclosure.

Referring to FIG. 12, a second electronic device establishes a communication link to a first electronic device by using a local area network in operation 1201.

After establishing the communication link to the first electronic device, the second electronic device checks whether application program execution information is received from the first electronic device through the communication link in operation 1203.

If the application program execution information is received from the first electronic device, ('YES') in operation 1203, the second electronic device checks an application program list for a first application program being executed in the first electronic device in step 1205. For example, the second electronic device may check the first application program being executed in the first electronic device through application program execution information provided from the first electronic device. Then, the second electronic device may select the application program list for the first application program among at least one application program list that is stored in a data storage unit. Otherwise, if the application program execution information is received from the first electronic device, ('NO') in operation 1203, the second electronic device continues to check whether application program execution information is received from the first electronic device through the communication link.

If checking the application program list for the first application program, the second electronic device displays the application program list for the first application program on a display unit in operation 1207. For example, the second electronic device 1710 may display on the display unit the pop-up window 1711 including memo, an address book and a browser that configure a list of application programs for the first application program as shown in FIG. 17.

Figure 13:
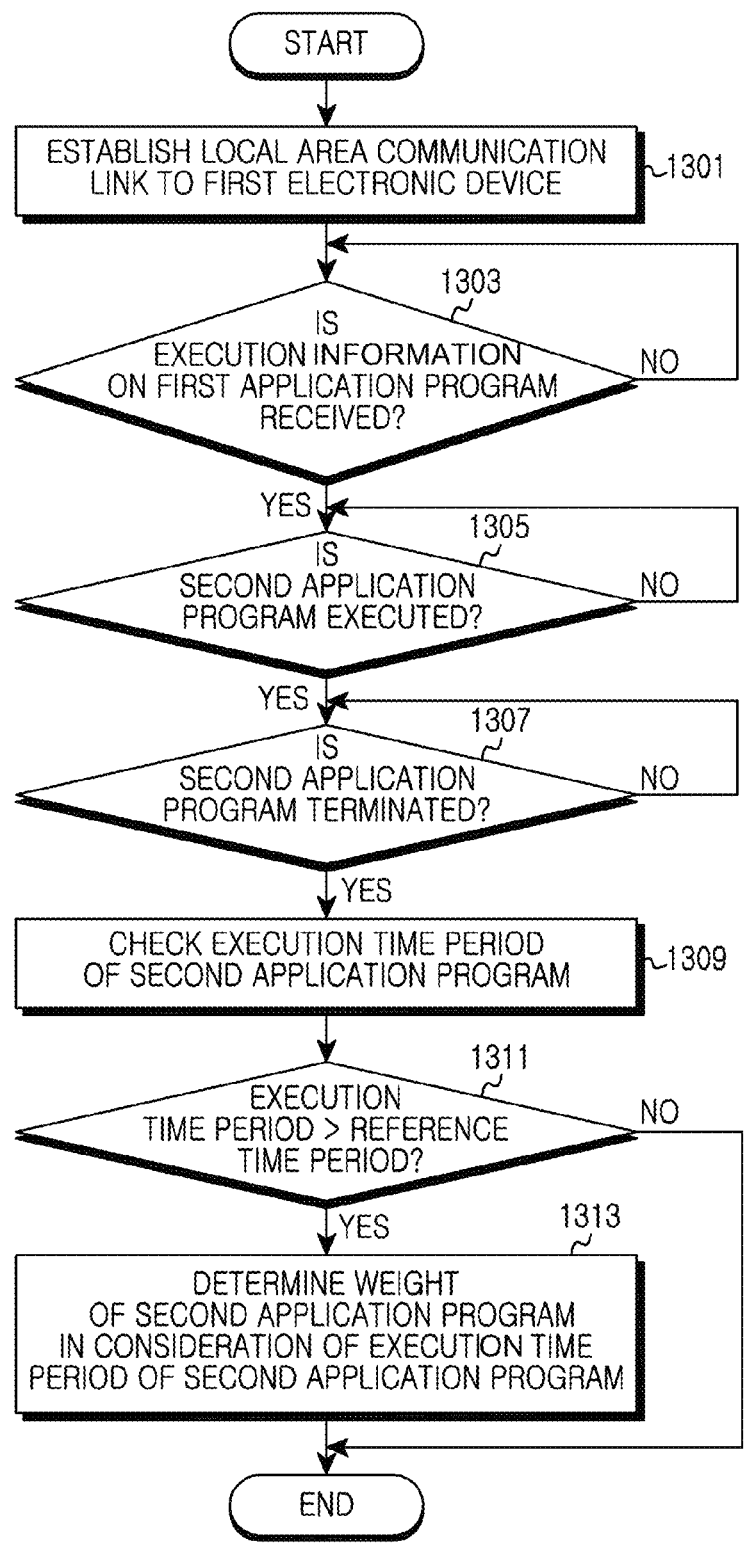
FIG. 13 is a flowchart of a procedure for creating an application program list for application programs provided through a local area network in an electronic device according to an embodiment of the present disclosure.

FIG. 13 is a flowchart of a procedure for creating an application program list for application programs provided through a local area network in an electronic device according to an embodiment of the present operation.

Referring to FIG. 13, a second electronic device establishes a communication link to a first electronic device by using a local area network in operation 1301.

After establishing the communication link to the first electronic device, the second electronic device checks whether application program execution information is received through the communication link in operation 1303.

If the application program execution information is received from the first electronic device ("YES") in operation 1303, the second electronic device checks whether a second application program is executed in operation 1305. In this case, the electronic device may check whether the second application program is executed within a reference time period after receiving the application program execution information. Here, the second application program may include at least one application program that is installed in the second electronic device. Otherwise, if the application program execution information is not received from the first electronic device ('NO") in operation 1303, the electronic device continues to check whether application program execution information is received through the communication link.

If the second application program is executed within the reference time period after receiving the application program execution information, ('YES') in operation 1305, the electronic device checks whether the second application program is terminated in operation 1307. Otherwise, if the second application program is not executed within the reference time period after receiving the application program execution information ('NO') in operation 1305, the electronic device continues to check if the second application program is executed within the reference time period after receiving the application program execution information.

If the second application program is terminated ('YES') in operation 1307, the electronic device checks the execution time period of the second application program in operation 1309. Here, the execution time period of the application program may include the time period from when an application is executed to when the application program is terminated. Otherwise, if the second application program is not terminated, ('NO') in operation 1307, the electronic device continues to check if the second application program is terminated.

Then, the electronic device checks whether the execution time period of the second application program is longer than the reference time period in operation 1311.

If the execution time period of the second application program is shorter than or equal to the reference time period, ('NO') in operation 1311, the electronic device perceives that the second application program is not added to the list of the first application program being executed in the first electronic device. Thus, the electronic device may terminate this algorithm.

On the other hand, if the execution time period of the second application program is longer than the reference time period, (YES') in operation 1311, the electronic device perceives that the second application program may be added to the list of the first application program being executed in the first electronic device. Thus, the electronic device determines the weight of the second application program relative to the first application program based on the execution information on the second application program in operation 1313. For example, the electronic device may calculate the weight of the second application program relative to the first application program in consideration of the execution time period of the second application program.

As described above, the second electronic device may determine the weight of the second application program relative to the first application program of the first electronic device based on the execution information on the second application program executed within the reference time period after receiving the execution information on the application program from the first electronic device. If another application program different from the second application program is further executed within the reference time period after receiving the application program execution information, the electronic device may repetitively determine the weight of another application program relative to the first application program based on the execution information on another application program according to operations 1309 to 1313 of FIG. 13.

As described above, if the weight of each application program is determined based on the execution information on each application program executed within the reference time period after receiving the application program execution information, the electronic device may create the application program list for the first application program based on the weight of each application program relative to the first application program. For example, the electronic device may create the application program list for the first application program to include information on at least one application program having a weight larger than a reference value. As another example, the electronic device may also create the application program list for the first application program to include information on a certain number of application programs from an application program having the largest weight.

Furthermore, the electronic device may also update an application program list table preset like Table 1 based on the weight of each application program relative to the first application program.

Figure 14:
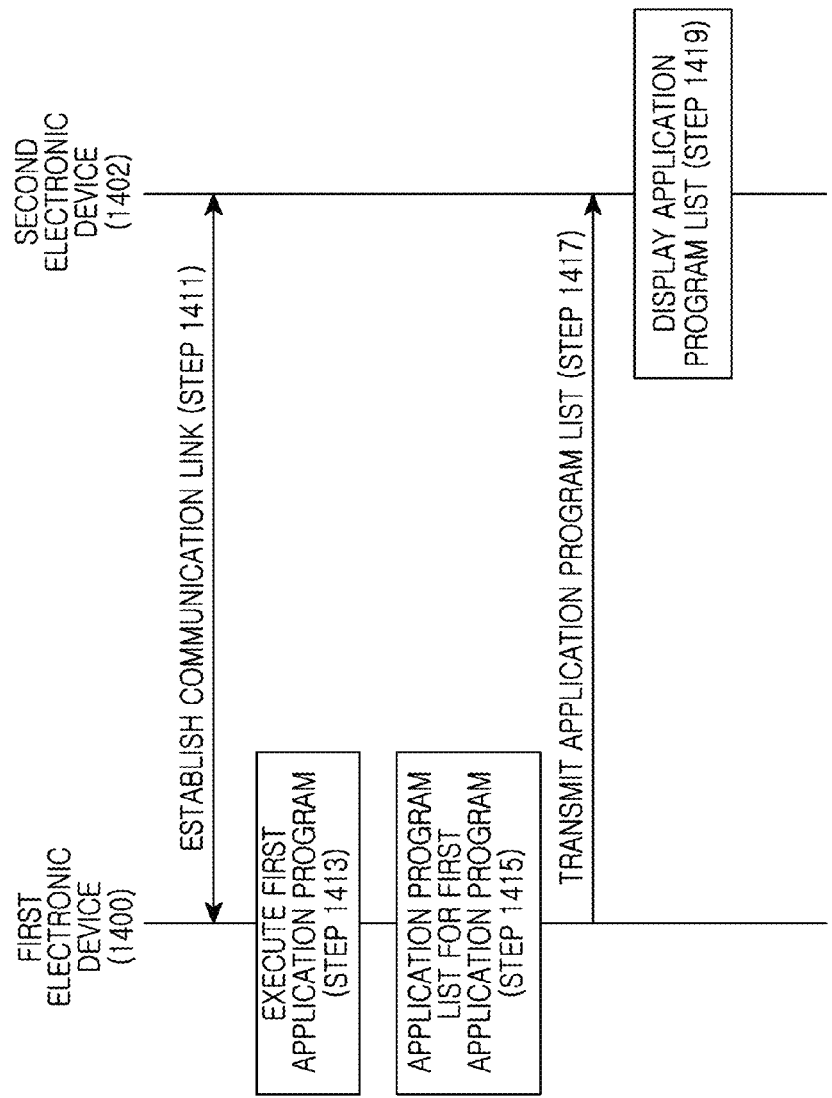
FIG. 14 is a flowchart of a procedure for displaying an application program list by using a local area network according to another embodiment of the present disclosure.

FIG. 14 is a flowchart of a procedure for displaying an application program list by using a local area network according to another embodiment of the present disclosure.

Referring to FIG. 14, a first electronic device 1400 and a second electronic device 1402 establishes a communication link through a local area network in operation 1411.

If the first electronic device 1400 executes a first application program in operation 1413, the first electronic device 1400 checks an application program list for the first application program in operation 1415. For example, the first electronic device 1400 may check the application program list for the first application program among at least one application program that is stored in a data storage unit.

Then, the first electronic device 1400 transmits application program list information to the second electronic device 1402 through the communication link in operation 1417. Here, the application program list information may include identification information on each application program that is included in the application program list for the first application program.

The second electronic device 1402 displays on a display unit the application program list for the first application program according to application program list information that is provided from the first electronic device 1400 in operation 1419. In this case, the second electronic device 1402 may extract at least one application program capable of being executed in the second electronic device 1402 among at least one application program included in the application program list information, and display the at least one application program on a display unit.

As described above, the second electronic device 1402 extracts information on at least one application capable of being executed in the second electronic device 1402 among application program list information provided from the first electronic device 1400, and displays the information on a display unit. Thus, the first electronic device 1400 and the second electronic device 1402 need to include the same identification information on each application program or share identification information on each application program.

Figure 15:
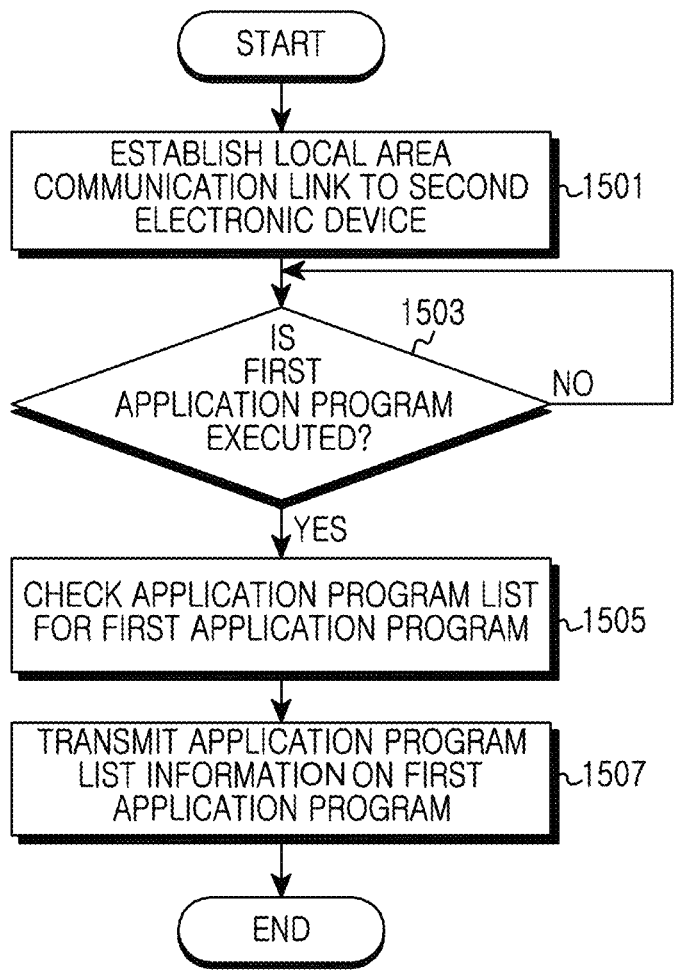
FIG. 15 is a flowchart of a procedure for transmitting an application program list through a local area network in an electronic device according to an embodiment of the present disclosure.

FIG. 15 is a flowchart of a procedure for transmitting an application program list through a local area network in an electronic device according to an embodiment of the present disclosure.

Referring to FIG. 15, a first electronic device establishes a communication link to a second electronic device by using a local area network in operation 1501.

After establishing the communication link to the second electronic device, the first electronic device checks whether a first application program is executed in operation 1503.

For example, the first electronic device may execute the first application program if a touch on an icon for the first application program is sensed through an input device. As another example, the electronic device may execute the first application program if a first application program execution signal, such as an incoming call is sensed.

If executing the first application program, ('YES') in operation 1503, the electronic device checks an application program list for the first application program in operation 1505. For example, if the incoming call is sensed, the first electronic device 1700 shown in FIG. 17 may execute a call application program. In this case, the electronic device displays a call-receiving screen on a display unit. If an event to display the application program list occurs in operation 1701, the first electronic device 1700 checks the application program list for the first application program among at least one application program list that is stored in a data storage unit. Otherwise, if not executing the first application program, ('NO') in operation 1503, the electronic device continues to check if executing the first application program.

Then, the first electronic device transmits application program list information to the second electronic device through the communication link to the second electronic device in operation 1507. Here, the application program list information may include identification information on each application program that is included in the application program list.

As described above, the first electronic device may check the application program list for the first application program among at least one application list stored in a data storage unit, if an event to display the application program list occurs. Thus, the first electronic device may create and store an application program list for each application program by using application program execution information and store the created list in a data storage unit. In this case, the first electronic device may create the application program list for each application program by using at least one of application program execution information in the first electronic device and application program execution information in the second electronic device to which the communication link is established as shown in FIG. 6.

Figure 16:
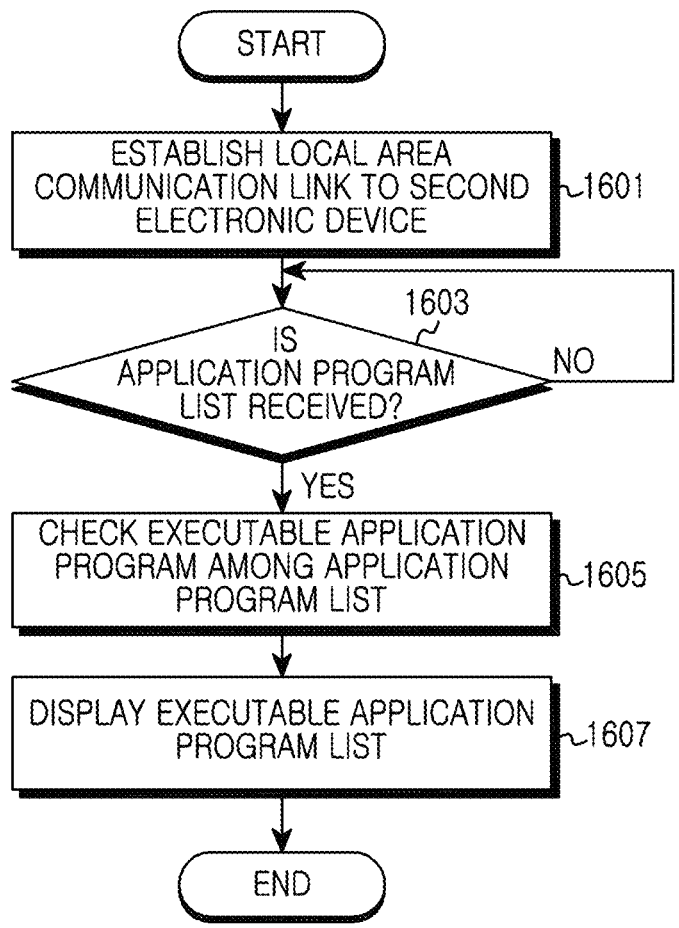
FIG. 16 is a flowchart of a procedure for displaying an application program list provided through a local area network in an electronic device according to an embodiment of the present disclosure.

FIG. 16 is a flowchart of a procedure for displaying an application program list provided through a local area network in an electronic device according to an embodiment of the present disclosure.

Referring to FIG. 16, a second electronic device establishes a communication link to a first electronic device by using a local area network in operation 1601.

After establishing the communication link to the first electronic device, the second electronic device checks whether application program list information is received from the first electronic device through the communication link in operation 1603.

If the application program list information is received from the first electronic device, ('YES') in operation 1603, the second electronic device selects at least one application program capable of being executed among at least one application program included in the application program list in operation 1605. That is, the second electronic device may select at least executable application from the application program list and update an application program list for a first application program. Otherwise, if the application program list information is not received from the first electronic device, ('NO') in operation 1603, the electronic device continues to check if the application program list information is received from the first electronic device.

After selecting the at least one executable application program from the application program list, the second electronic device displays on a display unit the updated application program list for the first application program in operation 1607. For example, the second electronic device 1710 may display on a display unit a pop-up window 1711 including memo, an address book, and a browser that configure the updated application program list for the first application program as shown in FIG. 17.

As described above, by aligning and displaying, according to user preference, at least one second application program associated with the first application program being currently executed, a user may easily search and execute the second application program.

Also, by aligning and displaying, according to user preference, at least one second application program associated with the first application program being currently executed in the second electronic device connected through a local area network, a user may easily search and execute the second application program.

It will be appreciated that various embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are various embodiments of machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and various embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   executing a first application;
   during the executing of the first application, determining an application program list including at least one application in an order corresponding to the executing of the first application based on weight of at least one application previously executed after the executing of the first application, wherein the application program list includes information on applications that may be executed after the execution of the first application; and
   displaying the application program list via the executing of the first application,
   wherein the weight of the at least one application is determined based on previous execution information of the first application,
   wherein the previous execution information comprises an execution order of the at least one application that was executed during or after a previous execution of the first application, and a time point of the at least one application that was executed during or after the previous execution of the first application.

2. The method of claim 1, further comprising:
   transmitting, to another electronic device, current execution information on the first application through a local area network, during the executing of the first application.

3. The method of claim 1, further comprising:
   transmitting, to another electronic device, information on the second application through a local area network, after the determining of the second application.

4. A method of displaying information in an electronic device, the method comprising:
   receiving current execution information from another electronic device through a local area network, the current execution information indicating that a first program is concurrently being executed in the other electronic device;
   determining an application program list including at least one application in an order corresponding to the executing of the first application based on weight of at least one application previously executed after the receiving of the current execution information, wherein the application program list includes information on applications that may be executed after the execution of the first application; and
   displaying the application program list via the executing of the first application,
   wherein the weight of the at least one application is determined based on the current execution information and previous execution information,
   wherein the previous execution comprises an execution order of the at least one application that was executed during or after a previous execution of the first application, and a time point of the at least one application that was executed during or after the previous execution of the first application.

5. An electronic device comprising:
   a display;
   a memory; and
   a processor,
   wherein the processor is configured to:
   execute a first application,
   while the first application is executing, determine an application program list including at least one application in an order corresponding to the executing of the first application based on weight of at least one application previously executed after the executing of the first application, wherein the application program list includes information on applications that may be executed after the execution of the first application, and
   control the display to display the application program list via the executing of the first application, wherein the weight of the at least one application is determined based on previous execution information of the first application, wherein the previous execution information comprises an execution order of the at least one application that was executed during or after a previous execution of the first application, and a time point of the at least one application that was executed during or after the previous execution of the first application.

6. The electronic device of claim 5, further comprising:

a transceiver configured to communicate with another electronic device, wherein the processor is further configured to transmit current execution information on the first application to the other electronic device.

7. The electronic device of claim 6, wherein the processor is further configured to transmit information on the second application to the other electronic device.

8. An electronic device comprising:

a display;

a transceiver;

a memory; and a processor, wherein the processor is configured to:

receive current execution information from another electronic device through the transceiver, the current execution information indicating that a first application is concurrently being executed in the other electronic device, determine an application program list including at least one application in an order corresponding to the executing of the first application based on weight of at least one application previously executed after the receiving of the current execution information, wherein the application program list includes information on applications that may be executed after the execution of the first application, and control the display to display the application program list via the executing of the first application wherein the weight of the at least one application is determined based on the current execution information and previous execution information, wherein the previous execution information comprises an execution order of the at least one application that was executed during or after a previous execution of the first application, and a time point of the at least one application that was executed during or after the previous execution of the first application.

* * * * *